May 16, 1967 R. D. MARTIN, JR 3,319,811
SWING AWAY RAMP
Filed April 23, 1965

INVENTOR
RAYMOND D. MARTIN, JR.

BY *Sherman Levy* ATTORNEY

United States Patent Office 3,319,811
Patented May 16, 1967

3,319,811
SWING AWAY RAMP
Raymond D. Martin, Jr., Centreville, Md., assignor to Tag-A-Long Trailers, Inc., Centreville, Md.
Filed Apr. 23, 1965, Ser. No. 450,390
2 Claims. (Cl. 214—85)

ABSTRACT OF THE DISCLOSURE

A loading ramp for wheeled vehicles such as trailers which in one position provides means for tractors or other equipment to be loaded onto or off of a trailer and in another position permits the trailer to readily roll or move along a road or the like.

---

This invention relates to loading ramps, and more particularly to loading ramps for wheeled vehicles such as trailers.

The primary object of this invention is to provide a loading ramp which in one position provides a convenient means for tractors and other equipment or loads to be loaded onto or off of a trailer, while in another position permits the trailer to readily and conveniently roll or move along a road or the like.

A further object is to provide a trailer ramp of the type stated which includes a mounting means that permits the ramps to be positioned in a vertical location on the trailer when the trailer is moving along a road, highway or the like so that the ramps will help prevent lateral shifting of the load, tractor or the like, while in another position the ramps can be arranged in an inclined fashion to facilitate loading and unloading of the trailer.

Still another object is to provide such a ramp that is economical to manufacture and efficient in operation and which is rugged in structure and foolproof in use.

These and other objects of the invention will become apparent from a reading of the following specification and claims, together with the accompanying drawing, wherein like parts are referred to and indicated by like reference characters and wherein:

Figure 1:
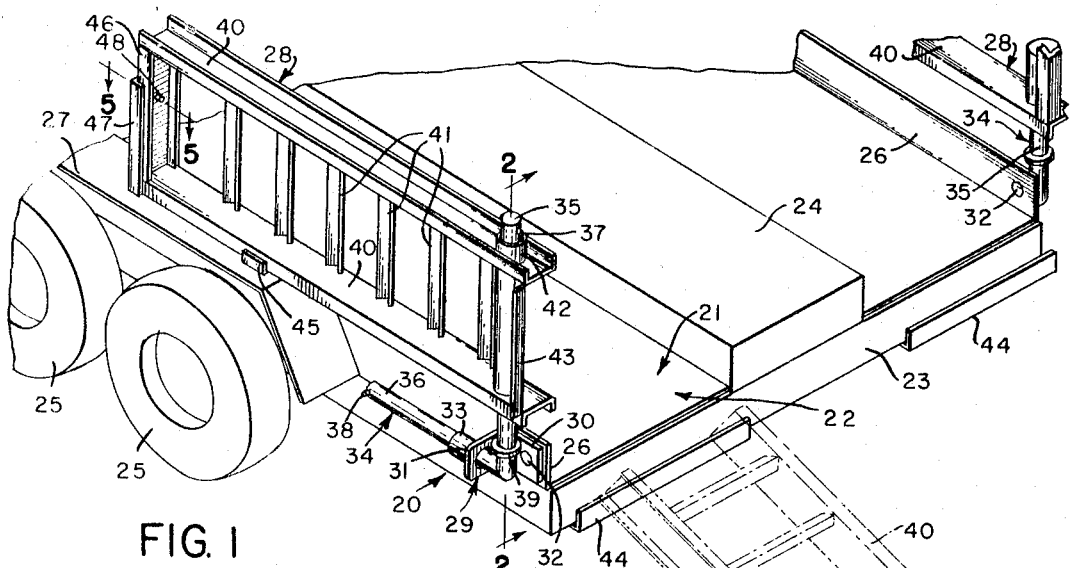
FIG. 1 is a fragmentary perspective view illustrating the present invention.

Referring in detail to the drawings, the numeral 20 indicates a trailer which includes a frame 21 having a trailer bed or deck 22, and the numeral 23 indicates a beam or end member at the rear of the trailer. The trailer may include a raised intermediate section 24 and is adapted to include the usual wheels 25. As shown in the drawings there is provided upstanding side members 26 which are suitably secured to or formed integral with the trailer frame, and the numeral 27 indicates side sections which are adapted to be arranged as shown in the drawings.

According to the present invention there is provided a pair of ramps which are each indicated generally by the numeral 28, FIG. 1. The numeral 29 indicates an L-shaped mounting member or bracket which includes first and second portions 30 and 31 that are arranged at right angles with respect to each other, and the portion 30 is pivotally or swivelly connected to the side member 26 by means of a pivot pin or securing element 32. The numeral 33 indicates a cylindrical hub which is secured to or formed integral with the portion 31 of the mounting bracket 29.

Figure 2:
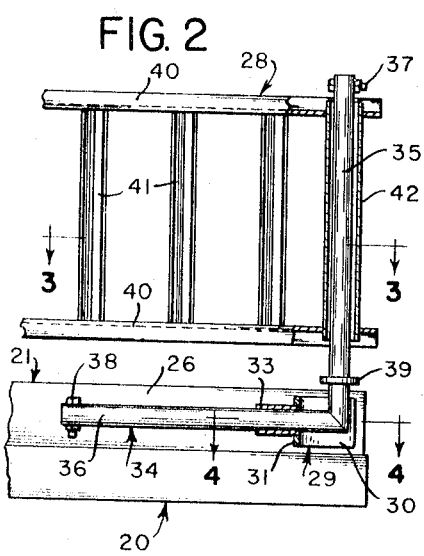
FIG. 2 is a sectional view taken on the line 2—2 of FIG. 1.
Figure 3:
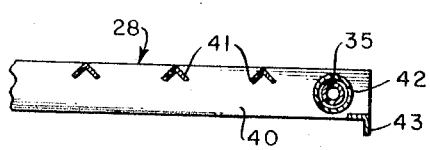
FIG. 3 is a sectional view taken on the line 3—3 of FIG. 2.
Figure 4:
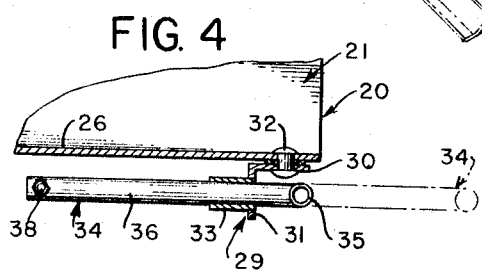
FIG. 4 is a sectional view taken on the line 4—4 of FIG. 2.

There is further provided for each ramp, an L-shaped pivot arm 34 which includes first and second portions or sections 35 and 36 that are arranged at right angles with respect to each other, and the portion 36 extends through the hub 33 as shown in FIG. 2 for example. Securing elements 37 and 38 extend through the ends of the portions 35 and 36 to define anchor pins. The numeral 39 indicates a circular flange or collar which is fixedly secured to the portion 35 of the pivot arm 34.

Each ramp 28 further includes a pair of elongated spaced parallel channel pieces 40, and a plurality of spaced parallel cross pieces or braces 41 extend between the channel pieces 40 and are secured thereto in any suitable manner, as for example by welding. The numeral 42 indicates a hollow elongated sleeve or tubular member which extends between the pair of channel pieces 40 and which is suitably affixed thereto, and the sleeve 42 has the first portion 35 of the pivot arm 34 swivelly and pivotally mounted or arranged therein.

The numeral 43 indicates a bracket which is secured to or formed integral with one end of the ramp 28, and the bracket or hook 43 is adapted to selectively engage a corresponding hook bracket 44 that is fixedly secured to the rear portion of the trailer 20 so that the ramps 28 can be supported in an inclined position as shown in dotted lines in FIG. 1 when a load is to be positioned on or removed from the trailer.

Suitably affixed to the upper portion of the side sections 27 are guide members 45 which are adapted to receive the lower portion of the ramp 28 when the ramp is in the solid line position of FIG. 1. The numeral 46 indicates an end piece which is fixedly secured to an end of the ramp 28, and the numeral 47 indicates a channel unit or channel member which has its lower end secured as by welding to the upper surface of the side section 27. A locking means consisting of a removable securing element or set screw or bolt 48 is adapted to extend through registering apertures in the members 47 and 46 to selectively maintain the ramp 28 stationary or immobile in the position shown in solid lines in FIG. 1.

It will therefore be seen that according to the present invention there has been provided a swing away ramp which is especially suitable for use in loading and unloading tractors or other equipment onto a member such as the trailer 20. In use, it will be seen that when the trailer is to be loaded or unloaded, the pair of ramps 28 are adapted to be moved from the solid line position of FIG. 1 to the dotted line position of FIG. 1 so that these ramps assume an inclined position which permits the wheels of a tractor or the like to readily travel up or down along the ramps. The lower ends of the ramps are adapted to rest on or engage the ground, and the hook brackets 43 on the other ends of the ramps are adapted to engage the hook brackets 44 at the rear of the trailer. This arrangement provides a means for insuring that the ramps will be properly supported in their inclined position.

When the ramps are not being used for loading or unloading the trailer, they are in the position shown in solid lines in FIG. 1 and also in the position shown in FIG. 2 and in this position, the securing element or screw member 48 extends through the registering apertures in the pieces 47 and 46 and this screw member 48 is adapted to engage a threaded aperture or opening in the piece 46 so as to lock or hold the ramp 28 in its proper vertical position. When the ramps 28 are in this vertical position, they function as a safety mechanism to help prevent any loads such as tractors or the like being transported on the trailer from shifting laterally off of the trailer.

Figure 5:
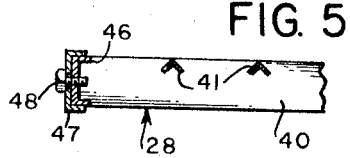
FIG. 5 is an enlarged sectional view taken on the line 5—5 of FIG. 1.

To move the ramp 28 from the solid line position of FIG. 1 to the dotted line position of FIG. 1 it is only necessary to loosen the screw member 48 and the ramp 28 can then be slid or moved rearwardly along the guide member 45 a sufficient distance so that the mounting member 29 can pivot on its axis extending through the pin 32 and then due to the provision of the tubular member 42 which is swively mounted on the portion 35 of the pivot arm 34, the ramp 28 can readily flip over to assume the dotted line position shown in FIG. 1 ready for use. In this inclined position, as previously described, the hook brackets 43 and 44 are arranged in engagement with each other to properly support the pair of ramps. Similarly, after the ramps 28 have been used for the desired purpose, the reverse procedure is followed. That is, the ramps 28 are readily manually pivoted about the portion 35 due to the provision of the tubular member 42 and then the member 29 is pivoted on its axis 32 so that the ramp 28 can be shifted forwardly in engagement with the guide member 45 until the pieces 46 and 47 abut or engage each other as shown in FIG. 5 whereby the locking element 48 can be replaced to hold the ramp 28 stationary in its desired position.

It is to be understood that the parts can be made of any suitable material and in different shapes or sizes as required or desired.

Also, the ramps of the present invention can be used on different sizes and types of trailers and in addition can be used with other types of equipment besides trailers such as trucks or the like.

The ramps 28 have a formation resembling a ladder due to the provision of the channel members 40 and cross pieces 41 and this arrangement permits the wheels of the tractor or the like to readily travel up or down to the desired location. The anchor pins 37 and 38 serve to insure that the pivot arm 34 will not accidentally pull out of its proper assembled position, and the collar 39 functions as a stop member to limit sliding or adjusting movement of the parts.

It is to be understood that there are a pair of the ramps 28 and when a tractor or the like is being loaded or unloaded from the trailer the pair of ramps are both moved to the proper inclined position. When the ramps are not needed, they can be readily swung away, and when the ramps are to be used, they can be readily manually moved or swung away to the loading and unloading position.

According to the present invention there has been provided a loading ramp wherein any type of equipment can be conveniently loaded onto a trailer or the like. When the ramps are not being used, they are moved to a storage position as shown in solid lines in FIG. 1. In other words, as shown in FIG. 1 in solid lines, the ramps are stored edgewise completely out of the way. By loosening the fastener or locking member 48, the ramps 28 can be slid rearwardly and then with a rotary downward motion, the ramps will come into place on the back of the trailers as shown in dotted lines in FIG. 1. The trailer 20 can be connected to a towing truck or the like by any suitable manner as for example by means of a suitable hitch. The trailer may be of the type that is used for hauling farm equipment or the like. The ramps of the present invention are constructed so that one person can easily move the ramps to the desired location and the ramps are constructed so that they are not awkward to manipulate. The trailers can also be used for transporting light industrial equipment or any other type of load. When the ramps are in the solid line position of FIG. 1 they are completely out of the way so that there will be no interference with use of the device. The bracket 43 and the hook or bracket 44 are positioned or located in such a manner that when these members are in engagement with each other, the ramp will have its upper end at the height of the trailer bed.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

What is claimed is:

1. In a trailer, a frame including a rearwardly disposed beam, said trailer including upstanding side members and raised side sections, spaced apart hook brackets affixed to the rear portion of the trailer, L-shaped mounting members pivotally connected to said side members and said mounting members including first and second portions arranged at right angles with respect to each other, said first portions being pivotally connected to said side members, a cylindrical hub affixed to said second portion of the mounting member, an L-shaped pivot arm including first and second sections arranged at right angles with respect to each other, and said second section of the pivot arm extending through said hub, anchor pins on the ends of the first and second sections of the pivot arm, a pair of ramps each including a pair of spaced parallel channel pieces, a plurality of cross pieces extending between said channel pieces and affixed thereto, a hollow sleeve at one end of each ramp extending between the channel pieces and secured thereto, said sleeve having a first portion of the pivot arm swively and pivotally mounted therein, a hook bracket on an end of the ramp for engagement with the corresponding hook bracket affixed to the rear of the trailer, guide members on said side sections, end pieces affixed to said ramps, channel units having their lower ends affixed to said side sections, and detachable securing elements for selectively engaging said channel units and end pieces.

2. A trailer comprising a frame, mounting members swively connected to said frame, pivot arms connected to said mounting members, ramps swively connected to said pivot arms, interengaging hook means on the ramps and trailer for supporting the ramps in an inclined position at the rear of the trailer, and locking means for selectively maintaining the ramps in a vertically longitudinally disposed position edgewise at the upper side portions of the trailer for support against lateral shifting of a load.

References Cited by the Examiner

UNITED STATES PATENTS

| | | | |
|---|---|---|---|
| 2,285,207 | 6/1942 | Johnson. | |
| 2,370,427 | 2/1945 | Sherry | 214—85 |
| 2,705,081 | 3/1955 | Jacobs | 214—85 |
| 2,767,016 | 10/1956 | Wood | 296—61 |
| 2,812,081 | 11/1957 | Schrader | 214—85 |
| 3,147,869 | 9/1964 | Fujioka et al. | 214—85 |

GERALD M. FORLENZA, *Primary Examiner.*

ALBERT J. MAKAY, *Examiner.*